(12) United States Patent
Paulsen

(10) Patent No.: US 10,017,928 B1
(45) Date of Patent: Jul. 10, 2018

(54) DUAL-FLOW FLAPPER VALVE ASSEMBLY

(71) Applicant: Dale Paulsen, Manchester, IA (US)

(72) Inventor: Dale Paulsen, Manchester, IA (US)

( * ) Notice: Subject to any disclaimer, the term of this patent is extended or adjusted under 35 U.S.C. 154(b) by 0 days.

(21) Appl. No.: 15/467,501

(22) Filed: Mar. 23, 2017

(51) Int. Cl.
*E03D 1/34* (2006.01)
*E03D 1/14* (2006.01)

(52) U.S. Cl.
CPC ............ *E03D 1/145* (2013.01); *E03D 1/34* (2013.01)

(58) Field of Classification Search
CPC .. E03D 1/34; E03D 1/42; E03D 1/144; E03D 1/145; E03D 1/35; E03D 1/304; E03D 1/306; E03D 1/308
USPC ..................................... 4/392, 393
See application file for complete search history.

(56) References Cited

U.S. PATENT DOCUMENTS

| | | | | |
|---|---|---|---|---|
| 2,504,555 A * | 4/1950 | Loether | ............... | E03D 1/304 4/397 |
| 2,760,206 A * | 8/1956 | Loyd | ............... | E03D 1/145 4/327 |
| 2,887,690 A * | 5/1959 | Hudkins | ............... | E03D 1/306 4/393 |
| 3,005,206 A * | 10/1961 | Dollinger | ............... | E03D 1/144 4/327 |
| 3,758,893 A * | 9/1973 | Smolinski | ............... | E03D 1/145 4/327 |
| 3,964,109 A * | 6/1976 | Street | ............... | E03D 1/144 4/327 |
| 4,328,596 A * | 5/1982 | Renz | ............... | E03D 1/30 4/324 |
| 4,937,894 A * | 7/1990 | Hill, Jr. | ............... | E03D 1/142 4/324 |
| 5,673,441 A * | 10/1997 | Wang | ............... | E03D 1/142 4/324 |
| 6,263,520 B1 * | 7/2001 | Song | ............... | E03D 1/142 4/324 |
| 6,381,765 B1 * | 5/2002 | Liu | ............... | E03D 1/142 4/393 |
| 6,901,610 B1 * | 6/2005 | Jensen | ............... | E03D 1/34 4/324 |
| 2004/0172747 A1 * | 9/2004 | Sirizzotti | ............... | E03D 1/14 4/393 |

* cited by examiner

*Primary Examiner* — J. Casimer Jacyna
(74) *Attorney, Agent, or Firm* — Zarley Law Firm, P.L.C.

(57) ABSTRACT

A dual-flow flapper valve assembly is presented having a flapper and a stopper that extends through an opening in a central portion of the flapper. In some embodiments of the present invention, a guide assembly extends downwardly from a bottom of the flapper and the stopper having a shaft that is received and extends through the flapper and the guide assembly, such that a top end of the shaft extends above the flapper and a bottom end extends below the guide assembly. In some arrangements of the present invention, the shaft has a plug adjacent the top end of the shaft and a stop at the bottom end.

18 Claims, 6 Drawing Sheets

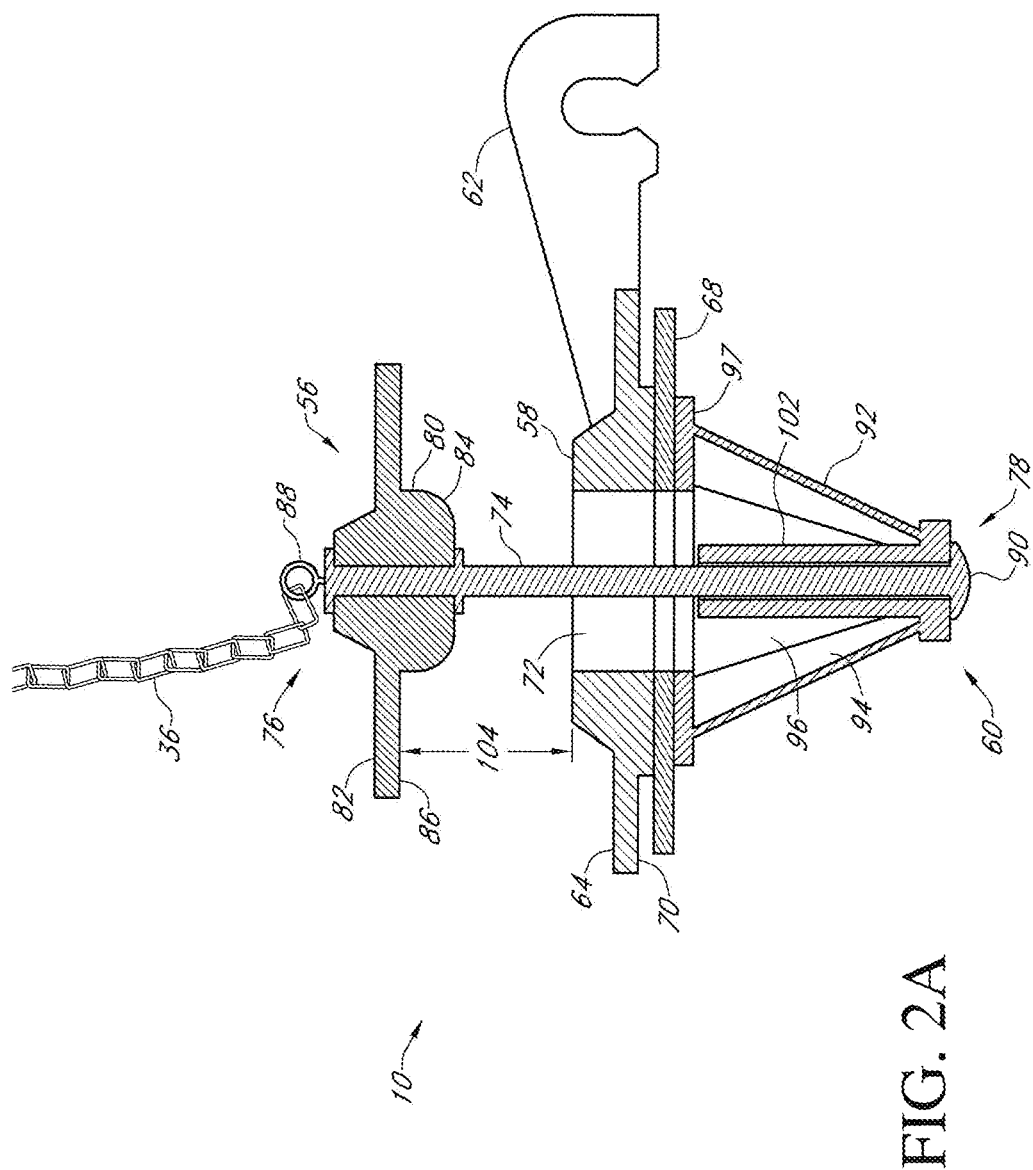

DUAL-FLOW FLAPPER VALVE ASSEMBLY

BACKGROUND OF THE INVENTION

This invention is directed toward flapper valves. More specifically, and without limitation, this invention relates to dual-flow flapper valve assemblies.

Flush assemblies are well known in the art. A conventional flapper is a single-piece element that is hingedly connected to the overflow tube of a flush valve assembly. When the lever of a toilet is pressed downwards, an arm within the tank is lifted that pulls a connection member that lifts the flapper that covers a drain that leads to the toilet bowl. When this action is completed, the water within the tank rushes through the drain while the flapper slowly floats back into place. The net result is that the tank is either completely emptied or substantially emptied and the toilet bowl is also emptied. For most toilets, this correlates in 1.6 gallons to 5 gallons of water being consumed by the overall system.

Although simplistic in design, conventional flappers suffer a number of deficiencies. The primary problem presented by such flappers is the tremendous amount of wasted water. A user is not capable of controlling the flow of water and this results in the tank being emptied in its entirety each time the toilet is flushed. Needlessly wasting water can cause problems for communities that face drought caused by overconsumption or harsh dry spells. In a related issue, the high consumption of water causes unnecessarily high water bills.

These problems are exacerbated by users who have an overactive bladder or intestinal issues. As a result of these conditions, the users use the toilet more frequently and thereby consume more water than the average person, which leads to even higher water bills.

One advancement that has taken place in the art is a dual-lever assembly. The dual-lever assemblies replace the conventional lever with two levers or buttons that actuate a modified flush valve assembly.

Although this advancement permits a user to select between two flow levels, this design has its deficiencies. One drawback of dual-lever assemblies is the complicated and difficult assembly requirements required to retrofit existing tanks with the assemblies. In order to install a dual-lever assembly, the existing flush valve assembly must be removed, which requires emptying and removing the tank from the toilet. This is not only time-consuming, but also intimidating to many inexperienced individuals who may want to limit water consumption. The difficulties associated with these systems are furthered, as a user must customize the flush valve assembly to get the desired flow for each level.

Dual-lever assemblies are also confusing to users as there are different levers and it is not always clear what each lever actuates. This results in the wrong button being selected, which in turn results in wasted water and higher utility bills.

Another problem associated with dual-lever assemblies is the cost. In comparison to conventional systems, these assemblies are substantially more expensive. This is often compounded by the need to have a plumber assist in installation.

Thus, it is a primary objective of this invention to provide a dual-flow flapper valve assembly that improves upon the art.

Another objective of this invention is to provide a dual-flow flapper assembly that reduces water usage.

Yet another objective of this invention is to provide a dual-flow flapper assembly that reduces utility bill amounts.

Another objective of this invention is to provide a dual-flow flapper assembly that can be retrofitted into an existing flush valve assembly quickly and without modification to other tank refilling assembly or flush valve assembly elements.

Yet another objective of this invention is to provide a dual-flow flapper assembly that is user-friendly.

Another objective of this invention is to provide a dual-flow flapper assembly that utilizes a single lever.

Yet another objective of this invention is to provide a dual-flow flapper assembly that is inexpensive.

These and other objectives, features, and advantages of the invention will become apparent from the specification and claims.

BRIEF DESCRIPTION OF THE DRAWINGS

FIG. 2A is a cut-away view of a dual-flow flapper valve assembly;

SUMMARY OF THE INVENTION

Figure 1:
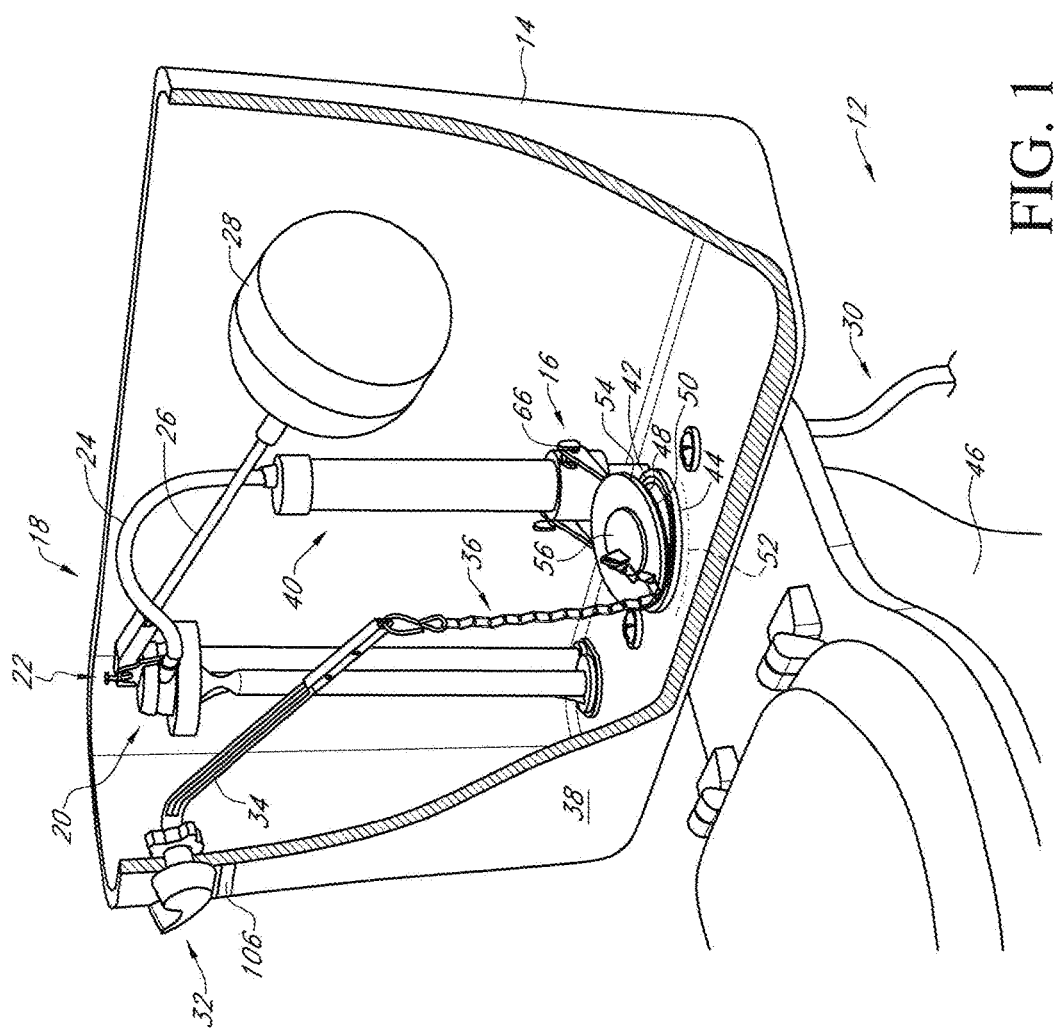
FIG. 1 is a perspective view of a dual-flow flapper valve assembly installed in a tank.
Figure 2B:
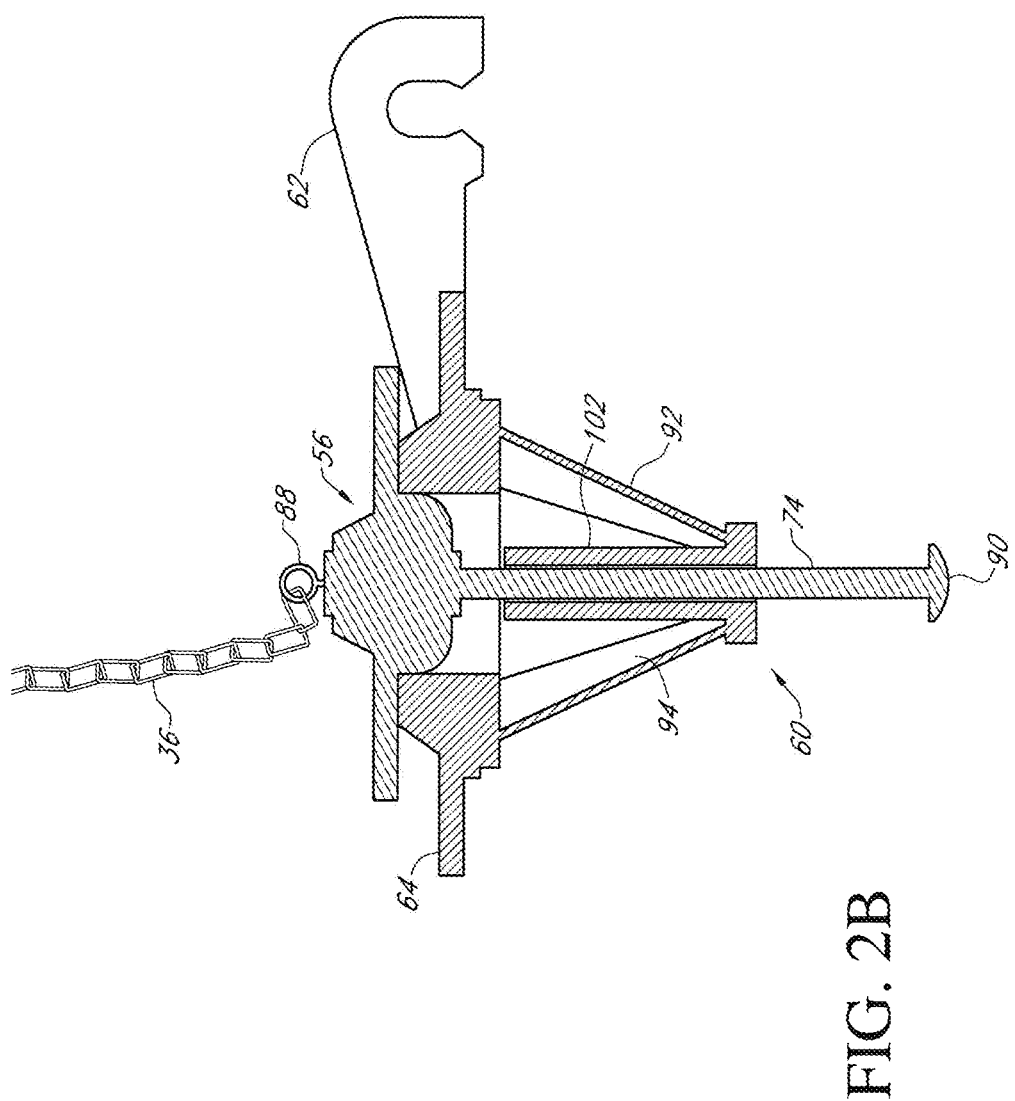
FIG. 2B is a cut-away view of a dual-flow flapper valve assembly.
Figure 3:
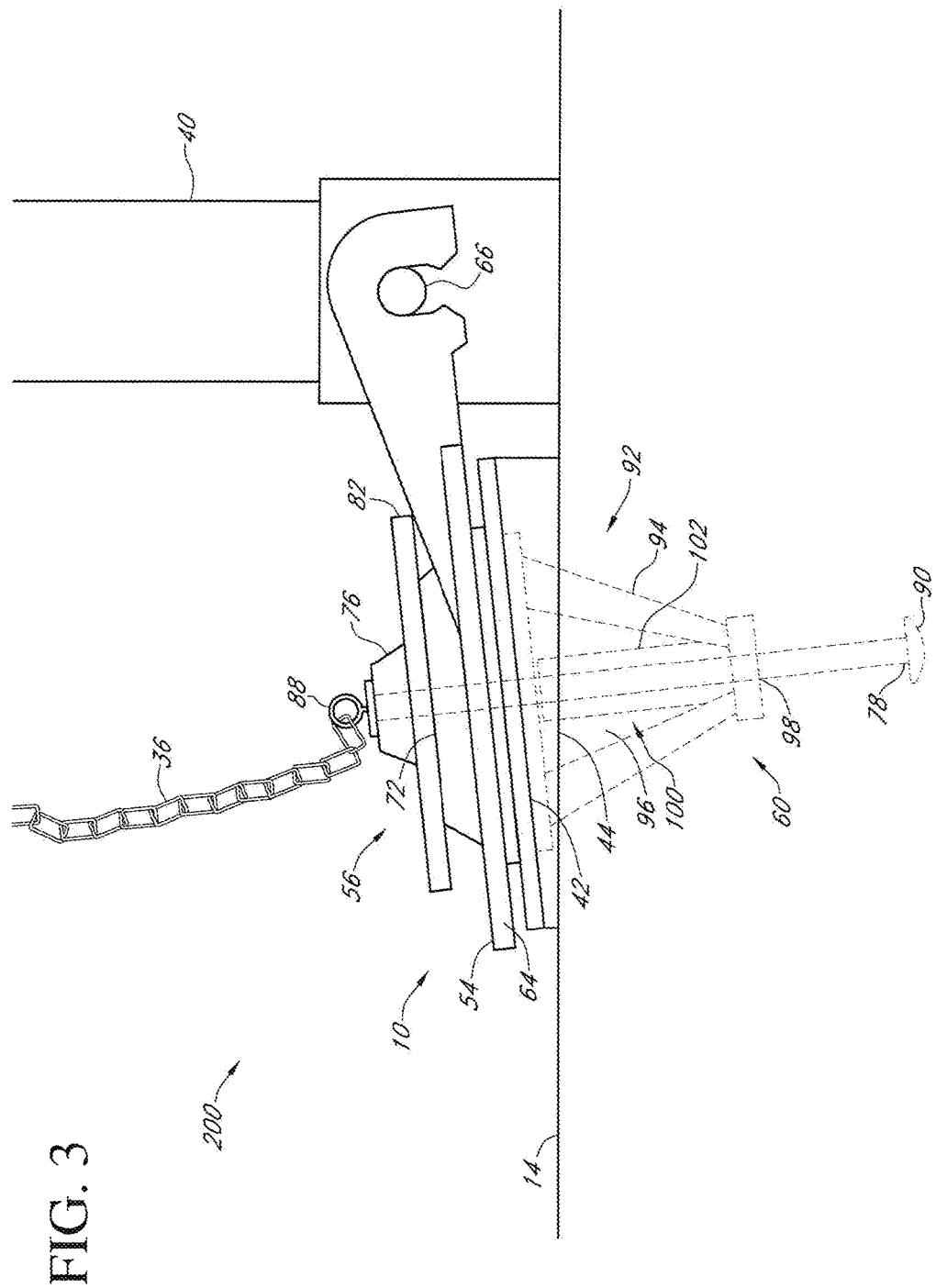
FIG. 3 is a side view of dual-flow flapper valve assembly in a sealed position.
Figure 4:
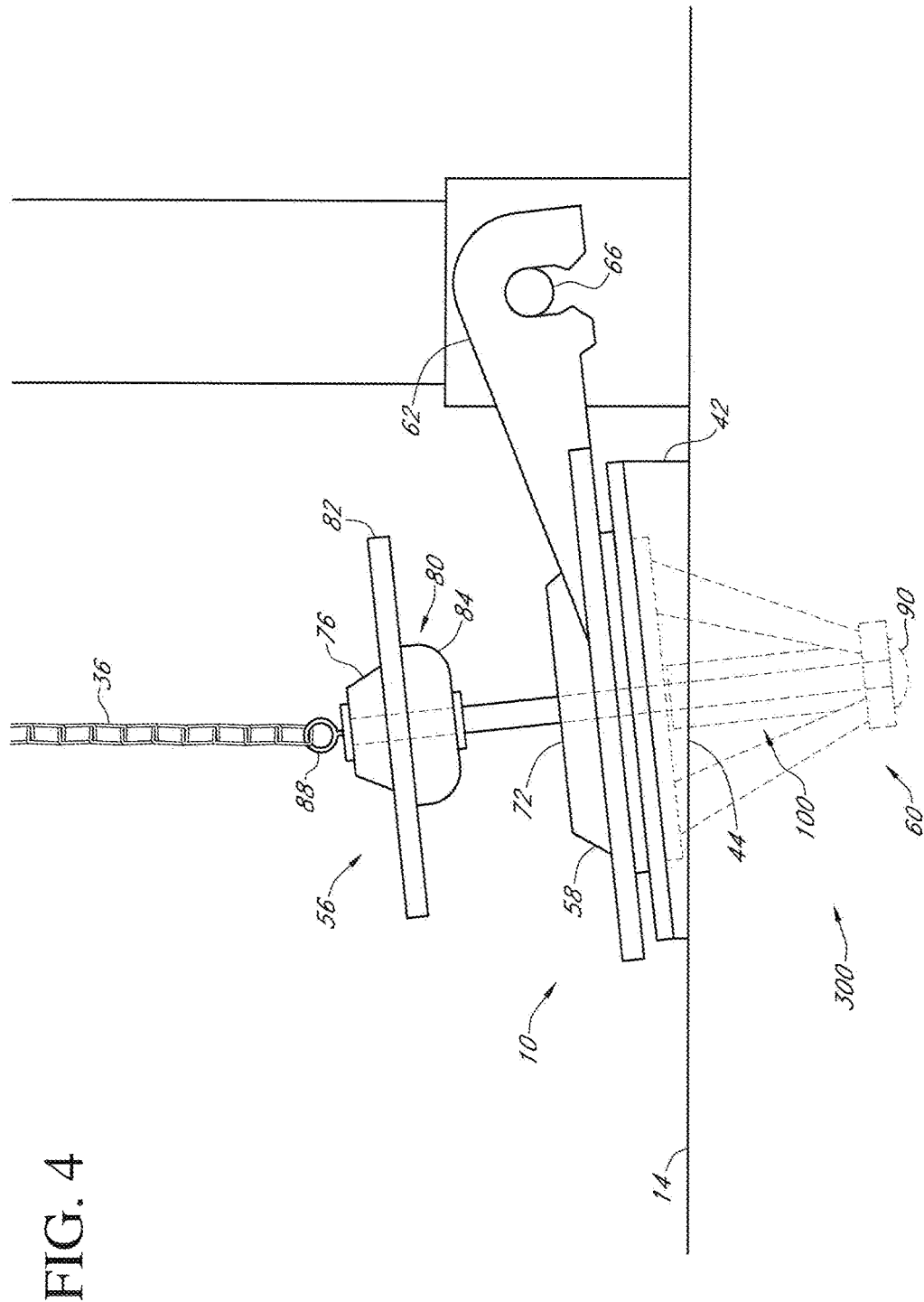
FIG. 4 is a side view of dual-flow flapper valve assembly in a low-flow position.
Figure 5:
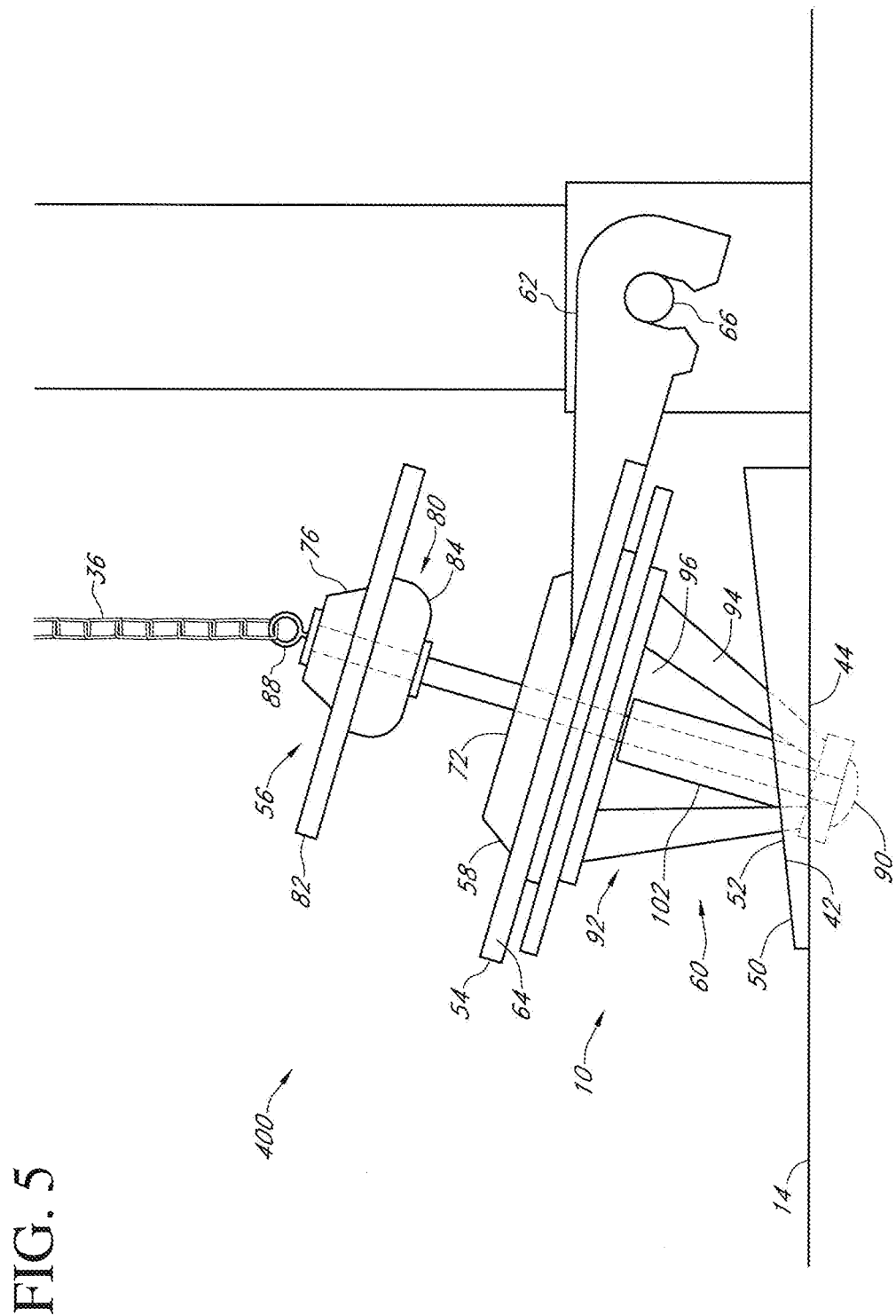
FIG. 5 is a side view of dual-flow flapper valve assembly in a normal-flow position.

In general, the present invention relates to a dual-flow flapper valve assembly. The dual-flow flapper valve assembly includes a flapper that has an opening formed in a central portion of the flapper. The present invention can include a guide assembly that extends from the bottom of the flapper and is a guide assembly. In some embodiments, the guide assembly has a primary guide and a secondary guide, with the primary guide having a plurality of supports with gaps between to form the exterior of the guide assembly. The secondary guide is positioned within the primary guide and extends upwardly towards the flapper. A stopper extends through the flapper and the guide assembly so that a shaft of the stopper extends beyond the flapper and the guide assembly. The stopper has limited free movement that is restricted by its position within the flapper and guide assembly. A plug and a stop at opposing ends of a shaft of the stopper prevent the stopper from being removed entirely.

The dual-flow flapper valve assembly is installed over an opening in a tank of a toilet, which can be in the form of a seat, a drain, or other similar opening. During use, the flapper and stopper are set upon one another such that a seal is formed over the opening in the tank, which prevents water from entering a bowl of the toilet. To transition to a low-flow position, the stopper is raised a length of the shaft that extends the distance between the stop at the bottom end of the shaft to the guide assembly. In this way, only the stopper is raised, which in turn removes the stopper from the opening in the flapper, which has a smaller diameter than the opening in the tank, thereby permitting a reduced amount of water to flow through to the opening in the tank and the bowl below. A further transition to a normal-flow position is completed by further raising the stopper, which now causes the flapper to raise up by way of the stop engaging the guide assembly that is part of the flapper. As a result, the flapper is moved away from the larger opening in the tank, which results in a normal flow of water to enter the bowl below.

DETAILED DESCRIPTION

With reference to the Figures, a dual-flow flapper valve assembly 10 that is used to flush a toilet 12 is shown. The dual-flow flapper valve assembly 10 is installed within a tank or cistern 14 of the toilet 12 as part of a flush valve assembly 16 that cooperates with a filling assembly 18 to empty and fill the tank 14 when the toilet 12 flushed.

As seen in FIG. 1, the filling assembly 18 in one embodiment includes a fill valve 20, a float adjustment screw 22, a fill tube 24, a float arm 26, and a float 28. The filling assembly is connected to a water line 30. Alternative arrangements are contemplated of the filling assembly 18, as long as the filling assembly 18 is configured to fill the tank 14 after the toilet 12 is flushed.

The flush valve assembly 16 in the illustrative embodiment cooperates with a handle 32, a handle arm 34, and a connection member 36. The handle 32 is positioned on and connected to an exterior surface 38 of the tank 14. At least a portion of the handle 32 extends through the tank 14 and connects to the handle arm 34. The actuation of the handle 32 by upward or downward movement raises the handle arm 34, which is connected to the connection member 36. In the embodiment shown, the connection member 36 is a chain, but in other embodiments any suitable method of connection is contemplated, including those methods that are configured to provide slack in the connection member 36 when the handle arm 34 is lowered. The connection member 36 is also connected to the dual-flow flapper valve assembly 10 at the end opposing the connection to the handle arm 34. Although this arrangement has been set forth, other embodiments are contemplated that connect an outside method of actuation to the dual-flow flapper valve assembly 10, including embodiments that use buttons and other variations without limitation.

The flush valve assembly 16 in the depicted arrangement includes an overflow tube 40 and a seat 42. The seat 42 is positioned within a drain 44 of the tank 14 that leads to a bowl 46 of the toilet 12. In some embodiments, the seat 42 has a seal or gasket 48 positioned around a top surface 50 of an opening 52 of the seat 42 that permits water to flow through to the drain 44.

The dual-flow flapper valve assembly 10 is hingedly connected to the overflow tube 40 and positioned to cover the seat 42 such that when handle 32 is not actuated, the dual-flow flapper valve assembly 10 prevents water from passing into the bowl 46. In other arrangements, the dual-flow flapper valve assembly 10 is positioned to cover the drain 44 directly, without the presence of a seat 42.

As shown in the illustrative example of FIGS. 2-6, the dual-flow flapper valve assembly 10 has a flapper 54, a stopper 56 that extends through a central portion 58 of the flapper 54, and a guide assembly 60. In other embodiments of the dual-flow flapper valve assembly 10, no guide assembly 60 is present.

The flapper 54 has one or more arms 62 that extend from a main portion 64 of the flapper 54 and hingedly connect to the overflow tube 40. In one arrangement, a pair of arms 62 hingedly connect to a pair of pegs 66 on the overflow tube 40. The main portion 64 of the flapper 54 is sized and shaped to cover the top surface 50 of the seat 42 or the drain 44 to form a watertight seal between the flapper 54 and the seat 42 or the drain 44. In one arrangement, the main portion 64 is circular in shape, but can be any suitable shape. The flapper 54 is made of rubber to provide a superior seal with the seat 42 or drain 44, but other materials are contemplated, including plastic that has the benefit of not corroding over time. In other embodiments, a seal or gasket 68 is attached or integrated to a bottom 70 of the main portion 64 such that the gasket 68 engages the seat 42 or drain 44 when the flapper 54 is in a closed position.

An opening 72 is formed in the central portion 58 of the main portion 64. The opening 72 extends through the flapper 54 such that water from the tank 14 can flow through the flapper 54 even when the flapper 54 is in a closed position and engages the seat 42 or drain 44 in a watertight engagement. In one arrangement, the opening 72 has a diameter of approximately 1.0 inch and in other arrangements the diameter of the opening 72 is 1.0 inch or less than 1.0 inch. In still other embodiments, the opening 72 is any diameter that is smaller than the diameter of the seat 42 or drain 44 the flapper 54 is set upon.

The stopper 56 has a shaft 74 that extends from a first end or top end 76 to a second end or bottom end 78. In the illustrative embodiment, the shaft 74 extends a sufficient length to extend through the opening 72 in the flapper and into the seat 42, and in other embodiments the shaft 74 extends a sufficient length to extend into the drain 44, and a combination of the seat 42 and drain 44.

Adjacent to the top end 76 is a plug 80. The plug 80 has a cover portion 82 that is sized and shaped to cover the opening 72 in the flapper 54 when the stopper 56 is in a closed position. In the depicted embodiment, the cover portion 82 has a diameter in excess of the diameter of the opening 72. In some arrangements, the cover portion 82 is circular, to match the shape of an opening 72.

As shown, in some embodiments, a bulbous portion 84 extends downwardly from a bottom 86 of the cover portion 82. In this arrangement, the bulbous portion 84 extends into the opening 72 of the flapper 54 and in some embodiments the seat 42 or drain 44 below when the stopper 56 is in a closed position. In other arrangements, the bulbous portion 84 has other sizes and shapes that are suitable to obstruct the opening 72, including a tapered configuration that tapers inwardly and downwardly from the perimeter of the cover portion 82 and away from the top end 76.

A connector 88 is attached to or integrated with the top end 76 to connect the connection member 36 so the stopper 56 is connected to the handle arm 34. A stop 90 is attached to or integrated to the bottom end 78 of the shaft 74. In one embodiment, the stop 90 is sized and shaped to have at least one diameter that is larger than the diameter of the opening 72 in the flapper 54. In this configuration, the stopper 56 can move uninhibited along a maximum vertical length of the shaft 74 between the cover portion 82 of the plug 80 and the stop 90.

The stopper 56 in some arrangements is a multi-piece design. In the other arrangements, the stopper 56 is a one-piece construction, which has the advantage of reducing cost associated with assembly and permits production by molding. The stopper 56 in some embodiments is made of rubber, especially the cover portion 82 to provide a superior watertight seal between the plug 80 and the opening 72 in the flapper 54. In one embodiment, at least the shaft 74 is made of brass due to brass's durability and the added weight that brass adds to the shaft 74 resulting in more control over the dual-flow flapper valve assembly 10 as detailed further herein.

The guide assembly 60 extends downwardly from the bottom 70 of the flapper 54. In one embodiment, the guide assembly 60 is a single-piece construction with the flapper 54, but in other embodiments the guide assembly 60 connects the bottom 70 of the flapper 54 or the gasket 68. The guide assembly 60 in the illustrative embodiment is sized and shaped to fit within the seat 42 or drain 44. In this way, the guide assembly 60 does not prevent the main portion 64 of the flapper 54 from forming a watertight seal.

The guide assembly 60 has a primary guide 92, which forms the exterior of the guide assembly 60. In one arrangement, the primary guide 92 has a plurality of supports 94 that extend downwardly and inwardly from the bottom 70 of the flapper 54 with gaps 96 positioned between each support 94 for water to pass through. In one embodiment, the primary guide 92 has three supports 94 equidistant from each other along a circular perimeter 97 of the primary guide 92 in a tripod-fashion. The plurality of supports 94 converge at an aperture 98. The aperture 98 in one embodiment is sized and shaped to be substantially the same diameter as the shaft 74, but not smaller than the diameter of the shaft 74.

In embodiments with a guide assembly 60, the shaft 74 of the stopper 56 extends a length through the opening 72 of the flapper 54 and through the guide assembly 60. In some arrangements, the stop 90 is sized and shaped to have a diameter larger than the aperture 98, which is smaller than the diameter of the opening 72 of the flapper 54. In this configuration, the stopper 56 can move uninhibited along a maximum vertical length of the shaft 74 between the aperture 98 of the primary guide 92 and the stop 90. The diameter of the aperture 98 further limits the uninhibited horizontal movement and the overall uninhibited angular movement of the stopper 56.

Some embodiments of the present invention further limit the uninhibited angular movement of the stopper 56 with a secondary guide 100 that extends substantially vertically along a predetermined length from the aperture 98 within the interior of the primary guide 92. In the illustrative embodiment, the secondary guide 100 has a cylindrical body 102, which is sized and shaped to be substantially the same diameter as the shaft 74, but not smaller than the diameter of the shaft 74, and does not extend to the flapper 54. The cylindrical body 102 and limited length of the primary guide 92 facilitates water flowing by and through the secondary guide 100 such that the secondary guide 100 does not inhibit the flow of water. The shaft 74 of the stopper 56 in this arrangement extends through the secondary guide 100 before extending through the aperture 98.

Although a multi-piece construction is contemplated, the primary guide 92 and secondary guide 100 in the illustrative embodiment are of a one-piece construction. In yet another embodiment, the flapper 54 and the guide assembly 60 are of a one-piece construction, which facilitates assembly thereby lowering costs by molding and the like.

In operation, the dual-flow flapper valve assembly 10 is in a first position or sealed position 200 when not being actuated by a user. In the sealed position 200 the flapper 54 is in a closed position and is in engagement with the seat 42 or drain 44, depending on the embodiment. In addition, the stopper 56 is also in a closed position with the cover portion 82 covering the central portion 58 of the flapper 54, thereby preventing water from entering the opening 72 of the flapper 54. In embodiments with a plug 80, the plug 80 is positioned within the opening 72. In this position, the shaft 74 of the stopper 56 extends through the opening 72 in the flapper 54 and through the guide assembly 60 such that at least a length of the shaft 74 that does not encompass the stop 90 extends below and past the aperture 98 in the primary guide 92. In one embodiment, the distance between the stop 90 and aperture 98 in the sealed position 200 is between 1.3 and 0.1 inches. In other embodiments the distance is between 1.0 and 0.5 inches.

A user then actuates the handle 32 to transition from the sealed position 200 to the second position or low-flow position 300, which in one embodiment involves applying downward pressure on the handle 32. Upon actuation, the handle arm 34 is raised and the connection member 36 is pulled in a generally upwards direction. The connection member 36 pulls the stopper 56 upwards removing the stopper 56 from sealing the opening 72 in the flapper 54. The user can continue to actuate the handle 32 until the stopper 56 is raised vertically the distance equal to the distance between the stop 90 and the aperture 98 in the sealed position 200. At this point, the stop 90 will engage the aperture 98 of the guide assembly 60. In one embodiment, the stopper 56 is configured to be lifted approximately 1 inch during the transition to the low-flow position. While actuating the handle 32, the guide assembly 60 facilitates in the stopper 56 being raised in a substantially upwardly vertical direction.

In other embodiments without a guide assembly 60, the stopper 56 is raised until the stop 90 engages the flapper 54.

The transition to the low-flow position 300 causes water to flow in a space 104 between the cover portion 82 and the flapper 54 and into the opening 72 of the flapper 54. The reduced diameter of the opening 72 results in a low-flow of water into the bowl 46, which is useful to either dilute liquid waste or to cause a low chug flush, which uses significantly less water. For example, using the low-flow position 300 to flush waste can save between 0.5 to 2.5 gallons per flush.

During actuation, the exterior surface 38 has an indicia 106 presented to indicate the positioning of the handle 32 to transition fully to a low-flow position 300. Alternatively, the smaller diameter of the cover portion 82 provides little to no resistance during actuation of the handle 32 in comparison to a normal flush, thereby indicating to the user that as soon as further resistance is encountered the end of the completion of the low-flow position 300 has been reached.

To flush solid waste, the user continues to actuate the handle 32 to transition to a third position or normal-flow position 400. During the transition to the normal-flow position 400 the stopper 56 is pulled upwards further and the stop 90 engages the primary guide 92 at the aperture 98, thereby causing the upward movement of the stopper 56 to cause the flapper 54 to lift. As the flapper 54 is lifted, water enters through the seat 42 or drain 44 directly, which has a larger diameter and permits larger amounts of water to pass. The positioning of the supports 94 and gaps 96 facilitate water passage, such that the guide assembly 60 does not inhibit water flow in any noticeable manner in comparison to other assemblies. The increase in water flow results in normal flush. The normal-flow position 400 is completed when the handle 32 reaches the full range of actuation.

At any time during operation, the user can stop actuation of the handle 32 and the flapper 54 and stopper 56 will descend in a substantially downward direction to seal the drain 44 in the sealed position 200. The presence of the secondary guide 100 further facilitates the stopper 56 consistently returning to the correction orientation that results in the plug 80 entering the opening 72 in the flapper 54. To increase the speed at which the stopper 56 descends, and thereby engages the flapper 54 to return it to the sealed position 200, a weighted stopper 56 is used. Alternatively, the stopper 56 in some embodiments has a shaft 74 that both adds weight and increases durability.

The dual-flow flapper valve assembly 10 provides the unique advantage of simplistic and expeditious retrofitting. In comparison to other assemblies that require disassembly and modification of numerous elements of the toilet 12, the present requires only a limited number of steps without modification or removal of any parts outside of the existing flapper 108 (not shown). The user first turns off the water line 30 and then flushes the toilet 12 through actuation of the handle 32. Next, the existing flapper 108 (not shown) is removed from the connection member 36 and the pegs 66 of the overflow tube 40. The dual-flow flapper valve assembly 10 is connected to the connection member 36 and overflow tube 40 as described herein. In the final step the user turns the water line 30 back on.

Therefore, a dual-flow flapper valve assembly 10 has been provided that reduces water usage, reduces utility bill expenditures, permits expeditious retrofitting without modification to other elements of the tank 14, flush valve assembly 16, or filling assembly 18, is user-friendly, utilizes a single lever, is inexpensive, and improves upon the art.

From the above discussion and accompanying figures and claims, it will be appreciated that the dual-flow flapper valve assembly 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A dual-flow flapper valve assembly comprising:
    a flapper having at least one arm configured to hingedly connect the flapper;
    a stopper that extends through an opening in a central portion of the flapper; and
    the stopper having a shaft that extends through the opening in the central portion and extends from a first end to a second end, wherein the shaft has a plug adjacent the first end and a stop at the second end.

2. The assembly of claim 1 further comprising a guide assembly extending downwardly from a bottom of the flapper, wherein the stopper extends through the guide assembly.

3. The assembly of claim 2 wherein the guide assembly and flapper are a one-piece construction.

4. The assembly of claim 2 further comprising the guide assembly having a primary guide forming the exterior of the guide assembly and a secondary guide positioned within the primary guide.

5. The assembly of claim 4 further comprising the primary guide having a plurality of supports that converge inwardly to an aperture.

6. The assembly of claim 1 further comprising the flapper hingedly connected to a flush valve assembly.

7. The assembly of claim 1 further comprising a connection member connected to a top end of the plug such that the connection member raises both the stopper and the flapper.

8. The assembly of claim 7 wherein the connection member is configured to pull the stopper upwards thereby removing the stopper from sealing the central opening along the length extending from the plug to the stop at a low-flow position, and the stop is configured to engage the flapper thereafter and raise the flapper from the low-flow position to the normal-flow position.

9. A dual-flow flapper valve assembly comprising:
    a flapper;
    an opening formed in a central portion of the flapper that extends through the flapper;
    a guide assembly extending downwardly from a bottom of the flapper;
    a stopper having a shaft that is received and extending through the flapper and the guide assembly, such that a top end of the shaft extends above the flapper and a bottom end of the shaft extends below the guide assembly;
    the stopper having a plug adjacent the top end of the shaft and a stop at the bottom end;
    wherein the plug restricts vertical downward movement of the plug past the flapper and the stop restricts vertical upward movement of the stop past the guide assembly; and
    comprising the flapper hingedly connected to a flush valve assembly and positioned over an opening in a tank, such that the guide assembly is received within the opening in the tank.

10. The assembly of claim 9 further comprising the shaft having a connector at the first end of the shaft.

11. The assembly of claim 9 wherein when in a sealed position, the plug is positioned over the opening in the central portion of the flapper and the flapper is positioned over the opening in the tank thereby preventing water from flowing through the opening in the tank.

12. The assembly of claim 9 wherein when in a low-flow position, the plug is positioned away from the opening in the central portion of the flapper and the flapper is positioned over the opening in the tank thereby permitting water to flow through the opening in the central portion of the flapper and the opening in the tank.

13. The assembly of claim 9 wherein when in a normal-flow position, the plug is positioned away from the opening in the central portion of the flapper and the flapper is positioned away from opening in the tank thereby permitting water to flow through the opening in the tank without inhibition from the flapper.

14. The assembly of claim 9 wherein the opening in the flapper has a diameter smaller than the diameter of the opening in the tank.

15. The assembly of claim 9 wherein the plug is sized and shaped to be received within the opening in the flapper.

16. A dual-flow flapper valve assembly comprising:
    a flapper having at least one arm configured for hingedly connecting the flapper;
    an opening formed in a central portion of the flapper that extends through the flapper;
    a guide assembly extending downwardly from a bottom of the flapper;
    a stopper having a shaft that is received and extending through the flapper and the guide assembly, such that a top end of the shaft extends above the flapper and a bottom end of the shaft extends below the guide assembly;
    the stopper having a plug adjacent the top end of the shaft and a stop at the bottom end;
    wherein the plug restricts vertical downward movement of the plug past the flapper and the stop restricts vertical upward movement of the stop past the guide assembly.

17. The assembly of claim 16 further comprising a connection member connected to a top end of the plug such that the connection member raises both the stopper and the flapper.

18. The assembly of claim 17 wherein the connection member is configured to pull the stopper upwards thereby removing the stopper from sealing the central opening along the length extending from the plug to the stop at a low-flow position, and the stop is configured to engage the flapper thereafter and raise the flapper from the low-flow position to the normal-flow position.

* * * * *